ABSTRACT OF THE DISCLOSURE

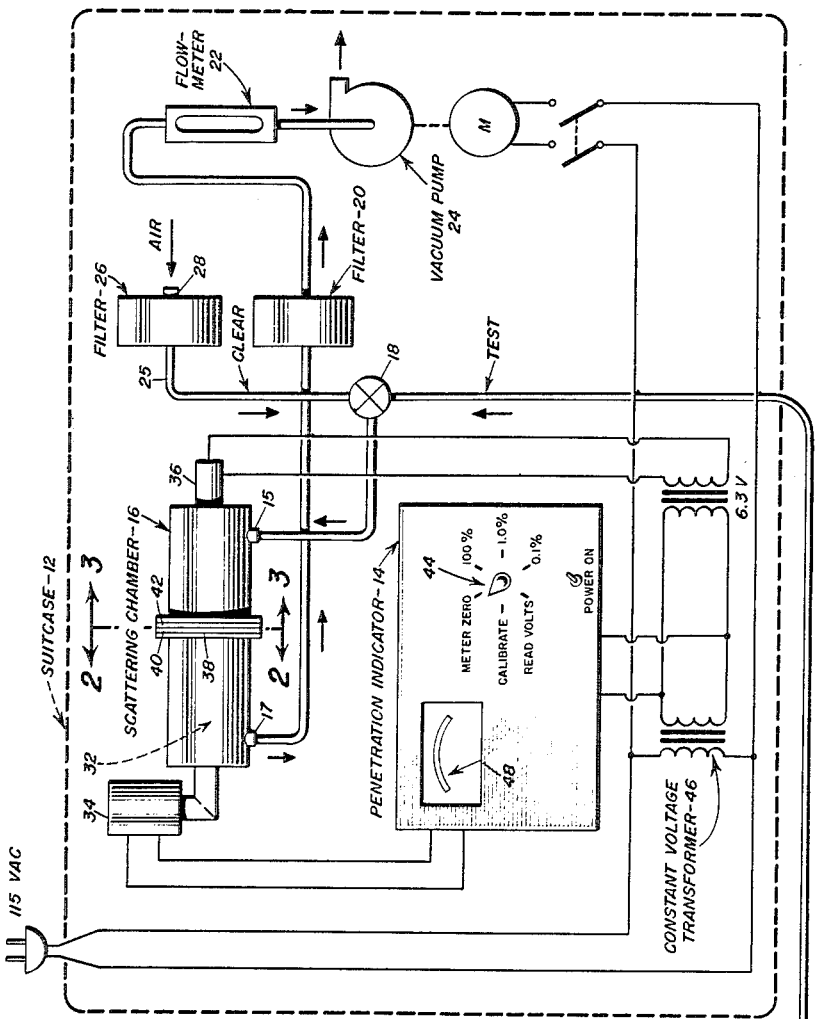
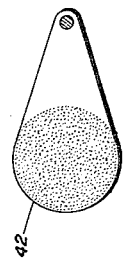
FIG. 3.
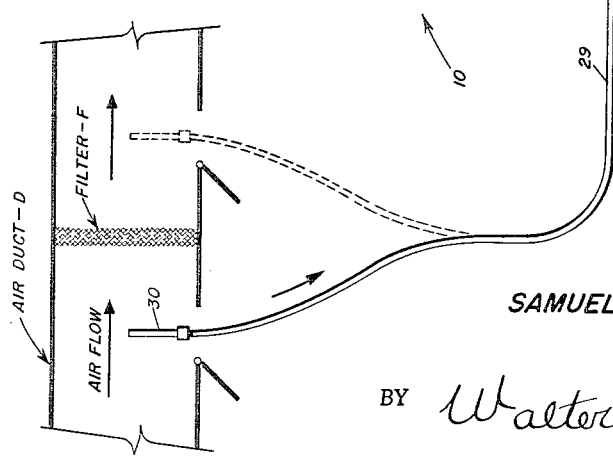
FIG. 2.
FIG. 1.
INVENTOR
SAMUEL B. STEINBERG
BY Walter G. Finch
ATTORNEY 3,473,876
PORTABLE FILTER EVALUATION DEVICE
Samuel B. Steinberg, 2108 Carterdale Road,
Baltimore, Md. 21209
Continuation of application Ser. No. 329,547, Dec. 10,
1963. This application Sept. 13, 1967, Ser. No. 675,998
Int. Cl. G01n 21/00
U.S. Cl. 356—103　　　　　　　　　　　　　　6 Claims

Portable apparatus for determining the efficiency of an air filter including an elongated chamber with a photo tube and light source mounted on the respective ends of the chamber. The chamber includes a light baffle for preventing direct illumination of the photo tube and an air input connected to a two-way valve for alternately sampling the air stream both above and below the filter.

---

This invention relates generally to measuring instruments, and more particularly it pertains to apparatus and method for measuring the efficacy of air filters. This patent application is a continuation of U.S. patent application Ser. No. 329,547 filed Dec. 10, 1963, for "Portable Filter Evaluation Device" now abandoned.

It is an object of this invention to provide a simple portable particulate detection instrument which can be set up easily and conveniently to test air filters in situ.

Apparatus for determining whether a filter is due for replacement or whether a new filter is efficient in removing particles from circulating air systems has heretofore been heavy, bulky and generally comprising a fixed laboratory arrangement. Consequently, it has been necessary to remove the questionable filter from the air system and send it to the laboratory for testing.

In many cases, this has been too much trouble and time consuming so that often replacement of a filter was done on an arbitrary elapsed time or other basis. This has been a costly practice because filters were often thrown away even though considerable life was still possible.

The present invention contemplates a suitcase type of measuring equipment which is brought to the site of the filter, and, using the normal air flow of the system in which the filter is used, a direct reading of efficiency can be taken in a few minutes to determine whether it is necessary to replace the filter.

Other objects and attendant advantages of this invention will become more readily apparent and understood from the following detailed specification and accompanying drawings in which:

FIG. 1 is a schematic of a portable particulate detection device incorporating features of this invention;

FIG. 2 is a cross section view of a spider filter taken along line 2—2 of FIG. 1; and FIG. 3 is a cross section of a 100% fiber taken along line 3—3 of FIG. 1.

Referring now to the details of the invention, as shown in FIGS. 1 to 3 of the drawings, the portable filter evaluation device or portable particulate detection device 10 consists generally of a light weight case 12 of the suitcase type with cover, latches and carrying handle for easy portability.

Within this case there is mounted a penetration indicator 14 arranged so it can be lifted or tilted on brackets for accessibility and reading without removing it from the case. A scattering chamber 16, associated with the penetration indicator 14, is secured in the case and its input 15 is connected by a tubular conduit to the common terminal of a two-way valve 18.

The output 17 of the scattering chamber 16 is connected by a conduit to an output filter 20 and thence to a flow meter 22. The flow meter 22 then connects to a motor driven vacuum pump 24 which exhausts to the atmosphere.

The "clear" side of the valve 18 is connected through conduit 25 to an input filter 26 for atmospheric air cleansing from an intake 28. The "Test" side of valve 18 is provided with a flexible hose 29 and a long probe tube 30.

Thus, the vacuum pump 24 draws either a reference purified atmospheric air from intake 28 or the more or less contaminated air sampled by the probe 30 through the scattering chamber 16, depending on the setting of valve 18.

The scattering chamber 16 consists of a light-tight cavity 32 completely blackened inside so as to avoid reflected light from the walls thereof. Communicating with one end of the cavity 32, there is provided a photo tube 34 which is mounted so as to view the opposite end. The opposite end of the cavity 32 is provided with a small light source 36 such as an incandescent lamp bulb.

Intermediate the ends of the cavity 32, there is provided a light-tight slot 38 through which a solenoid operated light stop or filter 40 or 42 (shown in FIGS. 2 and 3) respectively, can be selectively introduced in the optical path between the photo tube 34 and the light source 36.

Filter 40 of FIG. 2 is designated a spider filter because it consists of a light stop supported on fine wires so as to just shadow the direct rays from the light source 36 to the photo tube 34 without materially reducing the illumination inside the cavity 32.

The 100% filter 42 of FIG. 3 is a light reducing element designed to stop down the illumination in the left hand (photo tube 34) end of the cavity 32 a known amount without interfering with air flow. This is necessary to provide a more sensitive condition of measurement when required. The filters 40 and 42 are inserted or retracted by a solenoid, not shown, electrically connected with the meter switch 44 of the penetration meter 14 which is manually set for various ranges as desired.

To avoid instability of readings due to variations in line voltage, it is necessary to stabilize the supply voltage to both the penetration indicator 14 and the cell lamp or light source 36 by means of a constant voltage transformer 46 as shown in the schematic diagram FIG. 1.

It should be understood that the function of the penetration indicator 14 and the light scattering chamber 16 is to give a meter indication of the quantity of particles (drawn through the apparatus by the vacuum pump 24) by their light reflection, not obstruction, in the cavity 32. Therefore, the light intensity meter 48 reads upwardly with an increase in particle density in the air flow.

The light intensity meter 48 is calibrated or zeroed under the conditions of pure air flow and the light scattering chamber 16 is purged when valve 18 is set to "Clear." When the valve 18 is set to "Test," the probe tube 30 in introduced in the air system duct D first in the upstream side and then in the downstream side of the filter F being measured. The difference then between the two reading on meter 48 is an indication of the particle retention in the filter F.

Obviously, many modifications and variations of the present invention are possible in light of the above teachings. It is, therefore, to be understood that within the scope of the appended claims the invention may be practiced otherwise than as specifically described.

What is claimed is:
1. Portable apparatus for determining the efficiency of a filter while present in a filter system for filtering solid particles from air, comprising a carrying case, an elongated chamber positioned within said case and having non-reflecting interior walls and an input opening and an output opening spaced adjacent the ends of said chamber, two-way valve means positioned within said case, a conduit connected between said valve means and said input opening, a source of filtered fresh air, probe means for sampling air from said filter system alternately upstream and downstream of said filter, with said valve means communicating source of fresh air and the sampled air with said conduit, pump means positioned within said case and connected to the output opening of said chamber for drawing the air present in said conduit longitudinally through said chamber, photo tube and light source means positioned within said chamber in the ends thereof, means intermediate said input and output openings preventing said photo tube from being directly illuminated by said light source means but permitting light reflected by solid particles present in air drawn longitudinally through said chamber to be detected by said photo tube in the proportion of solid particles present in the air, and indicating means positioned within said case for indicating the amount of illumination receiver by said photo tube by reflection from said solid particles.

2. The portable apparatus of claim 1 wherein said chamber has a light-tight slot between said photo tube source and between said input and output openings, and filter means positionable in said light-tight slot for reducing the illumination by reflection by said solid particles by a pre-determined amount.

3. The portable apparatus of claim 2 wherein said preventing means incldues a light stop positioned in said light-tight slot adjacent to said filter means.

4. The portable apparatus of claim 1 wherein said source of filtered fresh air includes a conduit open to the atmosphere at one end and connected at the other end to said valve means and a filter element positioned in said conduit between said ends, thereby forming a clearing path through said apparatus identical with the path for said air sample from the valve to the said pump exhaust means.

5. The portable apparatus of claim 4 and additionally, flowmeter means positioned in said clearing path and air sample path within said case for measuring the flow of air caused by said pump means through said chamber.

6. The portable apparatus of claim 1 wherein said probe means includes a flexible hose and a probe tube connected thereto, said probe tube having an elongated end adapted to be inserted through the wall of a said filter system into the airstream therein.

References Cited

UNITED STATES PATENTS

| | | |
|---|---|---|
| 2,072,872 | 3/1937 | Finkelstein. |
| 2,406,409 | 8/1946 | Sheridan. |
| 2,513,283 | 7/1950 | Cahusac et al. _____ 250—218 |
| 2,638,688 | 5/1953 | Hazelton. |
| 2,819,608 | 1/1958 | McLaren et al. |
| 2,966,092 | 12/1960 | Hartridge. |
| 3,248,551 | 4/1966 | Frommer _____ 250—218 |
| 3,328,588 | 6/1967 | Steinberg _____ 250—218 |
| 3,354,772 | 11/1967 | Topol _____ 250—218 X |

OTHER REFERENCES

Sinclair-Phoenix: "Smoke Photometer," Bulletin JM-1000–C, Phoenix Precision Instrument Co., pp. 1–6.

Thomas et al.: "A Portable Photometer"; ISA Journal, vol. 8, No. 7, July 1961; pp. 52–56.

RALPH G. NILSON, Primary Examiner

C. M. LEEDOM, Assistant Examiner

U.S. Cl. X.R.

250—218; 356—246, 207

Disclaimer 3,473,876.—*Samuel B. Steinber*, Baltimore, Md. PORTABLE FILTER EVALUATION DEVICE. Patent dated Oct. 21, 1969. Disclaimer filed Nov. 19, 1974, by the inventor.

Hereby enters this disclaimer to all claims of said patent.

[*Official Gazette May 20, 1975.*]